(12) United States Patent
Ho

(10) Patent No.: US 9,074,111 B2
(45) Date of Patent: Jul. 7, 2015

(54) PAINT PROTECTIVE FILM COMPRISING NANOPARTICLES

(71) Applicant: 3M INNOVATIVE PROPERTIES COMPANY, St. Paul, MN (US)

(72) Inventor: Charlie C. Ho, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 14/357,931

(22) PCT Filed: Nov. 20, 2012

(86) PCT No.: PCT/US2012/066037
§ 371 (c)(1),
(2) Date: May 13, 2014

(87) PCT Pub. No.: WO2013/078190
PCT Pub. Date: May 30, 2013

(65) Prior Publication Data
US 2014/0302308 A1   Oct. 9, 2014

Related U.S. Application Data

(60) Provisional application No. 61/562,040, filed on Nov. 21, 2011.

(51) Int. Cl.
C09J 7/02     (2006.01)
B32B 27/40    (2006.01)
C09D 175/04   (2006.01)
C08J 7/04     (2006.01)
B29C 39/00    (2006.01)
C08K 3/00     (2006.01)
C08K 7/00     (2006.01)

(52) U.S. Cl.
CPC .............. *C09J 7/0282* (2013.01); *Y10T 428/25* (2015.01); *C09D 175/04* (2013.01); *C08K 3/0033* (2013.01); *C09J 7/0296* (2013.01); *C08K 7/00* (2013.01); *C09J 2201/162* (2013.01); *C09J 2203/306* (2013.01); *C09J 2205/106* (2013.01); *C09J 2475/006* (2013.01); *C08J 7/042* (2013.01); *B29C 39/003* (2013.01)

(58) Field of Classification Search
CPC ........ C08J 7/042; C08J 7/0282; C08J 7/0296; C08J 2203/306; C08J 2205/106; C08J 2201/162; C08J 2475/006; C09D 175/04; C08K 3/0033; C08K 7/00; B32B 27/08; B32B 27/18; B32B 27/40
USPC .................... 428/323, 423.3, 425.9
See application file for complete search history.

(56) References Cited

U.S. PATENT DOCUMENTS

| 5,037,579 A | 8/1991 | Matchett |
| 5,073,404 A * | 12/1991 | Huang ........................ 427/535 |
| 6,383,644 B2 | 5/2002 | Fuchs |
| 6,432,526 B1 | 8/2002 | Arney |

(Continued)

*Primary Examiner* — Thao T Tran
(74) *Attorney, Agent, or Firm* — Julie Lapos-Kuchar

(57) ABSTRACT

Described herein is a method of making a multi-layer article and paint protective films, wherein a mixture comprising a polyurethane coating solution and a plurality of nanoparticles is coated onto a casting liner to form a first layer; and a thermoplastic polyurethane is disposed onto the first layer opposite the casting liner. Multi-layer articles by the process of the present disclosure have been found to be resistant to compositions comprising strong acids and/or a functionalized organosilane.

12 Claims, 2 Drawing Sheets

(56) References Cited

U.S. PATENT DOCUMENTS

| | | |
|---|---|---|
| 6,635,723 B1 | 10/2003 | Maier |
| 6,905,772 B2 * | 6/2005 | Shoup et al. ............ 428/447 |
| 2008/0199704 A1 | 8/2008 | Ho |
| 2009/0000727 A1 * | 1/2009 | Kumar et al. ............ 156/230 |
| 2009/0004478 A1 | 1/2009 | Baetzold |
| 2010/0055471 A1 | 3/2010 | Fuhry |
| 2010/0239803 A1 | 9/2010 | Farkas |

* cited by examiner

PAINT PROTECTIVE FILM COMPRISING NANOPARTICLES

CROSS REFERENCE TO RELATED APPLICATIONS

This application is a national stage filing under 35 U.S.C. 371 of PCT/US2012/066037, filed Nov. 20, 2012, which claims priority to U.S. Provisional Application No. 61/562,040, filed Nov. 21, 2011, the disclosures of which are incorporated by reference in their entirety herein.

TECHNICAL FIELD

A process for preparing a multi-layer paint protection film comprising a plurality of nanoparticles is described along with compositions thereof.

BACKGROUND

Adhesive-coated films for use in the automotive industry are well known and have become more frequently employed in recent years to provide added functional and decorative features on the exterior surfaces of vehicles. For example in U.S. Pat. No. 6,383,644 (Fuchs), there is disclosed a multi-layer protective adhesive sheet. The sheet is typically adhered to relatively flat portions of car bodies such as flat bumper surfaces and flat side panels of the car body in low-lying areas where stone chips to the paint are prevalent. The sheet is taught to protect the particular parts of the car body to which it is adhered.

SUMMARY

The present disclosure is directed towards a multi-layer article for use to protect paint finishes. There is a desire to provide a multi-layer article for use as a paint protection film, which is able to provide, among other things, improved resistance to surface care products, specifically products comprising functionalized organosilanes and/or strong acids.

In one aspect of the present disclosure, a method of making a multi-layer article is provided comprising: coating a mixture comprising a polyurethane coating solution and a plurality of nanoparticles onto a casting liner to form a first layer, such that the first major surface of the first layer contacts the casting liner; and disposing a second layer onto the first layer opposite the first major surface.

In one embodiment of the method, each nanoparticle of the plurality of nanoparticles in the mixture has an average diameter of less than about 50 nm.

In another embodiment of the method, the second layer is contacted with an adhesive, such that the second layer is disposed between the first layer and the adhesive.

In another aspect of the present disclosure, a paint protection film is provided comprising sequentially: a first layer comprising a water-based polyurethane, and a plurality of unmodified, inorganic nanoparticles, wherein the unmodified, inorganic nanoparticles have an average diameter of about 50 nm or less; a second layer comprising a thermoplastic polyurethane; and an adhesive.

In another aspect of the present disclosure, a paint protection film is provided comprising sequentially: a first layer comprising a polyurethane, a plurality of nanoparticles, and a plurality of larger particles; a second layer comprising a thermoplastic polyurethane; and an adhesive; wherein the plurality of larger particles are disposed through the thickness of the first layer in an increasing size gradient towards the second layer The above summary is not intended to describe each embodiment. The details of one or more embodiments of the invention are also set forth in the description below. Other features, objects, and advantages will be apparent from the description and from the claims.

DETAILED DESCRIPTION

As used herein, the term

Figure 1:
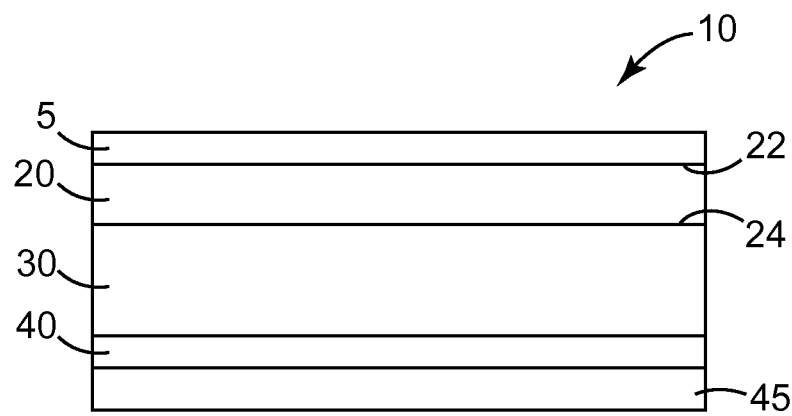
FIG. 1 is a side-view of one embodiment of a multi-layer article according to the present disclosure.

"a", "an", and "the" are used interchangeably and mean one or more; and

"and/or" is used to indicate one or both stated cases may occur, for example A and/or B includes, (A and B) and (A or B).

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

Automotive surface care products (e.g., glass care products), such as those sold under the trade designation "RAIN-X", available from Royal Dutch Shell, London, UK, are products applied to glass surfaces, which cause water to bead. Such glass care products typically comprise an organo-silicon compound, which contains one portion to react with the glass and a hydrophobic portion to repel water. It has been discovered that glass care products, containing these hydrophobic silicone polymers may cause cloudiness of films comprising polyurethane. Although not wanting to be bound by theory, it is suspected that the strong acid and/or functionalized organosilane present in the automotive surface care product is interacting/reacting with the polyurethane to cause the undesired cloudiness.

It has been discovered that multi-layer articles having a first layer comprising a polyurethane and a plurality of nanoparticles, when prepared according to the method of the present disclosure have improved resistance (i.e., have reduced or no cloudiness) to surface care products, specifically to those comprising strong acids and/or functionalized organosilanes.

Method of Making

A method of making a multi-layer article according to the present invention comprises applying a mixture onto a casting liner. The mixture is then dried and/or cured to form a first layer. The first major surface of the first layer contacts the casting liner. In one embodiment, a thermoplastic polyurethane layer is disposed onto the first layer opposite the first major surface to form a second layer.

The mixture, which forms the first layer of the multi-layer article of the present disclosure comprises a polyurethane coating solution and a plurality of nanoparticles. The polyurethane coating solution comprises a liquid polyurethane solution (e.g., an aqueous dispersion or solvent solution mixture of polyurethane). In one embodiment, other compounds such as cross-linking agents may be added.

In the practice of the method of the present disclosure, the polyurethane coating solution may be prepared using conventional practices, such as, for example, by an aqueous dispersion or solvent solution mixture. Nanoparticles are added to the polyurethane coating solution and mixed to form a mixture. This mixture is then cast or otherwise coated onto a casting liner.

The mixture is subsequently dried and/or cured on the casting liner to form a film. Once handleable, the film may be removed from the casting liner and either cured (if not previously cured) or further cured. Or, in another embodiment, the casting liner is removed just prior to or after application of the resulting film onto the end use product (e.g., an automobile). The major surface of the first layer, which was in contact with the casting liner is herein referred to as the first major surface.

After the first layer forms a film, a second layer is disposed onto the first layer. In one embodiment, a second layer comprising a thermoplastic polyurethane is disposed onto the second major surface of the first layer. As used herein, the second major surface of the first layer is opposite the first major surface of the first layer. In the present disclosure, the thermoplastic polyurethane may be a molten liquid or a handleable film, which is applied onto the first layer and allowed to form a second layer (e.g., by cooling, drying, and/or curing). In one embodiment, the thermoplastic polyurethane comprises other compounds as known in the art. The thermoplastic polyurethane may be disposed onto the first layer using techniques known in the art, including for example extrusion, casting, laminating, or molding techniques. In one embodiment, the second layer comprising the thermoplastic polyurethane can be bonded with the second major surface of the first layer by laminating the thermoplastic polyurethane at an elevated temperature and/or pressure. In another embodiment, the thermoplastic polyurethane is extruded directly onto the second major surface of the first layer. Such bonding techniques are further described in U.S. Pat. Publ. No. 2008/0199704 (Ho et al.), herein incorporated by reference. In one embodiment, an adhesive or adhesion promoter may be used between the first and second layer to improve adhesion therebetween.

In one embodiment, an adhesive is applied such that the second layer comprising the thermoplastic polyurethane is disposed between the adhesive and the first layer. To facilitate bonding between the second layer and the adhesive layer, it can be desirable to corona treat (e.g., air or $N_2$ corona treatment) and thermally laminate the major surface of the second layer to be bonded to the adhesive. To accomplish this, the major surface of the second layer, which is not in contact with the first layer, is exposed and then corona treated. If a hot laminating process is used, the thermoplastic polyurethane is extruded onto a releasable liner or web, and the releasable liner or web is removed from the thermoplastic polyurethane before applying the adhesive to the second layer.

In one embodiment, the multi-layer article made by the method of the present disclosure further comprises a release liner, wherein an adhesive layer is disposed between the release liner and the second layer. The release liner is present to protect the adhesive from inadvertently contacting undesired surfaces, remaining free of particulates, and/or providing additional structural support during transportation. The adhesive is typically coated onto the release liner and then contacted with the second layer, such that the adhesive is disposed between the release liner and the second layer. However, in one embodiment, the adhesive is directly coated or applied onto the major surface of the second layer, which is not in contact with the first layer. In one embodiment, the casting liner may be used as both a casting liner and a release liner, e.g., when the multi-layer article is wound upon itself.

Described below are paint protective films, however, the processes and articles described herein are applicable to multi-layer articles made according to the present disclosure having at a minimum a first layer comprising a polyurethane coating solution and a plurality of nanoparticles.

Article

Shown in FIG. 1 is one embodiment of a paint protective film of the present disclosure. Paint protective film 10 is provided comprising first layer 20. First layer 20 comprises a polyurethane and a plurality of nanoparticles. Second layer 30 comprises a thermoplastic polyurethane. Second layer 30 is disposed between first layer 20 and adhesive layer 40. In one embodiment, optional casting liner 5 is disposed on top of layer 20 opposite second layer 30. In one embodiment, optional release liner 45 is disposed on adhesive layer 40, opposite second layer 30. Adhesive layer 40 is used to affix the paint protective film to the final substrate (e.g., a vehicle). In the present disclosure, the major surface of the first layer contacting casting liner 5, referred to as first major surface 22, will eventually be the outwardly-facing side of the multi-layer article. Second major surface 24 is opposite the first major surface 22. In one embodiment, additional layers, such as adhesives, etc. may be disposed between the various layers described in FIG. 1 to improve, for example, the adhesion between the various layers or to improve the performance of the paint protective film.

In the present disclosure, the first layer comprises a polyurethane coating solution and a plurality of nanoparticles, which is subsequently dried and/or cured to form a first layer. The nanoparticles are added to the coating solution comprising a curable polyurethane to form a homogeneous mixture. This homogeneous mixture is then applied onto a casting liner and dried and/or cured to allow handling. Curing will lead to the formation of a durable film. The first major surface of the first layer becomes the outwardly-facing surface of the film and additional layers are built upon the second major surface of the first layer to form a multi-layered article.

Casting Liner

As used herein, a casting liner, is any substrate upon which the mixture can be coated and is subsequently removed from. The casting liner is used to support the mixture as it dries and/or cures to form the film of the first layer. A casting liner comprises a smooth or flat surface upon which the mixture can form a smooth surface and/or controls the gloss of the finished article (e.g., to form matte film). Exemplary casting liners include, films such as biaxially-oriented polyester (such as polyethylene terephthalate) and papers that may be coated or printed with a composition (such as polyacrylics, etc.) that will enable release from the first layer. The mixture comprising the polyurethane coating solution and the plurality of nanoparticles can be applied onto a casting liner using conventional techniques and equipment known by those skilled in the art such as knife coaters, roller coaters, reverse roll coaters, notched bar coaters, cutain coaters, roto-gravure coaters, rotary printer and the like.

First Layer

The first layer of the present disclosure comprises a polyurethane and a plurality of nanoparticles.

The polyurethane comprises at least one of a polyester-based polyurethane or a polycarbonate-based polyurethane (e.g., a combination of a polyester-based polyurethane or a polycarbonate-based polyurethane).

In one embodiment, the polyurethane consists of, consists primarily of, or at least comprises a water-based polyurethane. The water-based polyurethane may be made from an aqueous-based polyurethane dispersion. In some cases, it may be desirable to use aqueous-based polyurethane dispersions, because of the elimination of the volatile solvents typically associated with using solvent-based polyurethane.

In some embodiments, the polyurethane consists of, consists primarily of, or at least comprises a polyurethane layer formed directly by polymerization of a composition comprising at least one polyisocyanate and at least one polyol.

Useful polyols include, for example, polyester polyols, polycarbonate polyols, and combinations thereof.

Examples of suitable polyols include materials commercially available under the trade designation "DESMOPHEN" from Bayer Corporation (Pittsburgh, Pa.). The polyols can be polyester polyols (e.g., DESMOPHEN 631A, 650A, 651A, 670A, 680, 110, and 1150); polyether polyols (e.g., DESMOPHEN 550U, 1600U, 1900U, and 1950U); or acrylic polyols (e.g., DEMOPHEN A160SN, A575, and A450BA/A); polycaprolactone polyols such as, for example, those caprolactone polyols available under the trade designation "TONE" from Dow Chemical Co. (Midland Mich.) (e.g., TONE 200, 201, 230, 2221, 2224, 301, 305, and 310) or under the trade designation "CAPA" from Solvay (Warrington, Cheshire, United Kingdom) (e.g., CAPA 2043, 2054, 2100, 2121, 2200, 2201, 2200A, 2200D, 2100A, 3031, 3091, and 3051)); polycarbonate polyols (e.g., those polycarbonate polyols available under the trade designations "PC-1122", "PC-1167" and "PC-1733" from Picassian Polymers (Boston, Mass.) or under the trade designation "DESMOPHEN 2020E" from Bayer Corp., Pittsburgh, Pa.); and combinations thereof. The choice of the degree of reactive (e.g., —OH) functionality (e.g., difunctional) will generally be selected depending on the degree of crosslinking desired in the resultant polyurethane.

Examples of suitable polyisocyanates include: aromatic diisocyanates (e.g., 2,6-toluene diisocyanate; 2,5-toluene diisocyanate; 2,4-toluene diisocyanate; m-phenylene diisocyanate; p-phenylene diisocyanate; methylene bis(o-chlorophenyl diisocyanate); methylenediphenylene-4,4'-diisocyanate; polycarbodiimide-modified methylenediphenylene diisocyanate; (4,4'-diisocyanato-3,3',5,5'-tetraethyl)diphenylmethane; 4,4'-diisocyanato-3,3'-dimethoxybiphenyl (o-dianisidine diisocyanate); 5-chloro-2,4-toluene diisocyanate; and 1-chloromethyl-2,4-diisocyanato benzene), aromatic-aliphatic diisocyanates (e.g., m-xylylene diisocyanate and tetramethyl-m-xylylene diisocyanate); aliphatic diisocyanates (e.g., 1,4-diisocyanatobutane; 1,6-diisocyanatohexane; 1,12-diisocyanatododecane; and 2-methyl-1,5-diisocyanatopentane); cycloaliphatic diisocyanates (e.g., methylenedicyclohexylene-4,4'-diisocyanate; 3-isocyanatomethyl-3,5,5-trimethylcyclohexyl isocyanate (isophorone diisocyanate); 2,2,4-trimethylhexyl diisocyanate; and cyclohexylene-1,4-diisocyanate); polymeric or oligomeric compounds (e.g., polyoxyalkylene, polyester, polybutadienyl, and the like) terminated by two isocyanate functional groups (e.g., the diurethane of toluene-2,4-diisocyanate-terminated polypropylene oxide glycol); polyisocyanates commercially available under the trade designation "MONDUR" or "DESMODUR" (e.g., "DESMODUR W") from Bayer Corporation (Pittsburgh, Pa.); and combinations thereof. In some embodiments, an aliphatic diisocyanate may be preferred when used for exterior applications.

In one embodiment, a crosslinker, as is known in the art, is present in the polyurethane coating solution to crosslink the polyurethane. Exemplary crosslinkers include: a polyaziridine, a polycarbodiimide, an epoxy, or combinations thereof. If cross-linking is desired, one or more triisocyanates in combination with at least one diisocyanate in the reactive components used to make the polyurethane may be used, however this is not a requirement.

Such compositions and methods of making the polyurethane of the first layer are known in the art. See for example, U.S. Pat. Publ. Nos. 2008/0199704 (Ho et al.) and 2010/0055471 (Fuhry) and U.S. Pat. No. 6,635,723 (Maier et al.), which are all herein incorporated by reference.

The first layer of the present disclosure not only comprises a polyurethane, but also comprises a plurality of nanoparticles.

The nanoparticles used in the present disclosure are preferably substantially spherical.

The nanoparticles are herein defined as particles having an average diameter of at least about 1, 2, 3, 4, 5, 6, 7, 8, 9, or even 10 nm; and at most about 15, 20, 25, 30, 25, 40, 45, or even 50 nm. The nanoparticles used in the present disclosure can be discrete (i.e., un-aggregated) particles, aggregates of particle or both.

In one embodiment of the present disclosure, the nanoparticles are unmodified inorganic nanoparticles. As used herein, an "unmodified" inorganic nanoparticle means that the surface of the inorganic nanoparticle is not irreversibly associated (e.g., covalently or otherwise permanently-bonded) with organic compounds. In other words, the unmodified inorganic nanoparticle is a bare nanoparticle or the surface of the nanoparticle comprises an ionic interaction with a stabilizing ion. For example, zirconia may be stabilized with acetates or nitrates, whereas silica may be stabilized with sodium or ammonium ions.

The unmodified inorganic nanoparticles of the present disclosure may comprise oxide nanoparticles. Such oxides include, for example, silicon dioxide (silica), zirconia, titania, ceria, alumina, iron oxide, zinc oxide, vanadia, antimony oxide, tin oxide, alumina/silica. Although the oxide may be essentially pure, it may contain small amounts of stabilizing ion such as ammonium and alkaline metal ions, or it may be a combination of oxides such as a combination of titania and zirconia.

The unmodified inorganic nanoparticles as used herein may be distinguished from materials such as fumed silica, pyrogenic silica, precipitated silica, etc. Such silica materials are known to those of skill in the art as being comprised of primary particles that are essentially irreversibly bonded together in the form of aggregates, in the absence of high-shear mixing. These silica materials have an average size greater than 100 nm (e.g., typically of at least 200 nanometers) and from which it is not possible to straightforwardly extract individual primary particles.

The unmodified inorganic nanoparticles may be in the form of a colloidal dispersion. Examples of useful commercially available unmodified silica nanoparticles include commercial colloidal silica sols available from Nalco Chemical Co. (Naperville, Ill.) under the trade designation "NALCO COLLOIDAL SILICAS". For example, such silicas include NALCO products 1040, 1042, 1050, 1060, 2327 and 2329. Examples of useful metal oxide colloidal dispersions include colloidal zirconium oxide, suitable examples of which are described in U.S. Pat. No. 5,037,579 (Matchett), and colloidal titanium oxide, useful examples of which are described in U.S. Pat. No. 6,432,526 (Arney et al.).

Generally, the amount of nanoparticle used in the mixture is at least about 2500 ppm (parts per million), 3000 ppm, 5000 ppm, 10,000 ppm, 50,000 ppm, 100,000 ppm, or even 200,000 ppm.

Generally, the nanoparticles are added to the polyurethane coating solution as a mixture, i.e., the nanoparticles are dispersed in a liquid, which is then added to the polyurethane coating solution. Having the nanoparticles dispersed in a liquid and the polyurethane particles dispersed in a liquid aids in the blending of the nanoparticles and the polyurethane and is advantageous because there is less dust created during mixing than in the case of dry blending.

The nanoparticles are added to the polyurethane coating solution and form a mixture.

It has been discovered, that the presence of the plurality of nanoparticles at the first major surface (i.e., the outwardly-facing surface) of the first layer contribute to the surprising properties of the multi-layer article, including for example the resistance to surface care products and/or improved elongation.

In one embodiment of the present disclosure, the first layer comprises not only a polyurethane and a plurality of nanoparticles, but also a plurality of larger particles. As used herein "larger particles" means particles that are substantially larger than the individual nanoparticles added to the composition (i.e., at least about 5, 10, or even 15 times larger equivalent circular diameter). In one embodiment, the larger particles have an average equivalent circular diameter of at least about 60, 70, 75, 80, 90, or even at least 100 nm. In one embodiment, the larger particles are clusters of discrete smaller particles (e.g., nanoparticles).

Figure 2:
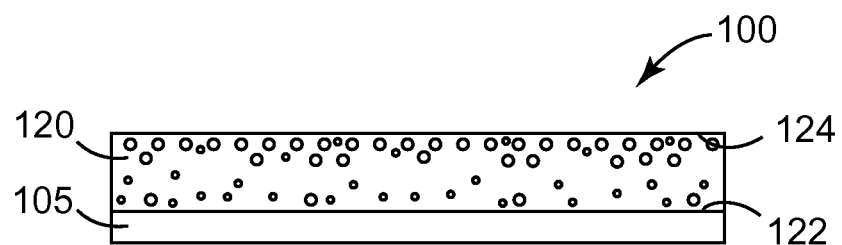
FIG. 2 is an expanded view of first layer 20, showing the increasing particle size gradient.

In one embodiment, the plurality of larger particles form a gradient within the first layer as shown in FIG. 2. FIG. 2 is a schematic showing first layer 120, which has been coated on top of casting liner 105. First major surface 122 contacts casting liner 105, while second major surface 124 is the exposed air side during coating. As shown in FIG. 2, there is a distribution of larger particles disposed through the thickness of the first layer. The particles near the second major surface have a larger size than the larger particles near the first major surface. For purposes of this disclosure, "near the second major surface" means at a distance perpendicular to the first layer which is within 200, 150, 100, or even 50 nm of the second major surface. For purposes of this disclosure, "near the first major surface" means at a distance perpendicular to the first layer which is within 200, 150, 100, or even 50 nm of the first major surface.

In one embodiment, a water-based polyurethane in the first layer is preferable. However, when a plurality of unmodified inorganic nanoparticles are used, although they may be initially homogeneously dispersed with the water-based polyurethane, there may be a tendency for the unmodified inorganic nanoparticles to settle to the bottom of the coated mixture and/or to form clusters of nanoparticles, wherein the larger clusters tend to move (or float) to the top of the coated mixture. Thus, in one embodiment, there is a difference in the average size of the particles between the opposing sides of the first layer, when viewed across the thickness of the first layer. Because when the nanoparticles cluster, they may not form spherical clusters, but instead chains or irregular-shaped clusters. The area of these clusters may be calculated and the equivalent circular diameter calculated (i.e., the diameter of a circular that would produce the same area). In one embodiment, the area-weighted average equivalent circular diameter of a larger particle near the first major surface is less than about 75, 70, 60, or even 50 nm, while the area-weighted average equivalent circular diameter of a larger particle near the second major surface is greater than about 100, 125, or even 150 nm.

In one embodiment, the increasing size gradient of the larger particles of the first layer is discontinuous, meaning that there is not a continuum of increasing particle sizes across the first layer, but instead larger particles localized near the first and second major surfaces of the first layer and perhaps not in the bulk.

In one embodiment, the first layer has a thickness of at least larger 5, 10, 15, 20, or even 25 µm (micrometer); and at most larger 50, 75, 80, 90 or even 100 µm.

Second Layer

The second layer comprises a thermoplastic polyurethane. Generally this layer differs from the first layer comprising the polyurethane in that the thermoplastic polyurethane has substantially no-crosslinking as compared to the polyurethane of the first layer.

As used herein, substantially no-crosslinking means that the thermoplastic may have some crosslinking, however, the polyurethane is able to melt, or at least soften, when heated to a sufficiently high temperature and forms a bond that is strong enough to pass the "Tape Snap Adhesion Test" if a layer of the polyurethane is laminated to a layer of the thermoplastic polyurethane. In contrast, a "thermoset polyurethane" is one that is so heavily crosslinked that it does not exhibit a sufficient amount of melting or softening if heated. That is, a thermoset polyurethane will generally burn rather than melt or soften, and would not form a bond that is strong enough to pass the "Tape Snap Adhesion Test" if a layer of the thermoset polyurethane is laminated to a layer of the thermoplastic polyurethane, even if the thermoplastic polyurethane is heated before it is laminated.

The thermoplastic polyurethane of the present disclosure is known to those skilled in the art and is commercially available. See for example, U.S. Pat. Publ. Nos. 2008/0199704 (Ho et al.) and US 2010/0239803 (Farkas et al.), which are both herein incorporated by reference.

Typically, to ensure little to no crosslinking, polyisocyanates and polyols are elected such that they are difunctional (i.e., diisocyanate or diol) as opposed to trifunctional or higher functionalities, however a minor amount of cross-linking may be tolerable in some cases.

In one embodiment, the first layer and/or the second layer includes leveling agents, UV absorbers, moisture scavengers, antioxidants, antifoaming agents, coloring agents (including dyes and/or pigments), decorative solids, or combinations thereof. Such additives are known in the art.

In one embodiment the thickness of the second layer is at least 100, 125, 150 or even 175 µm; and at most 200, 225, 250, 300, 325, or even 350 µm.

Adhesive

In one embodiment, the adhesive of the present disclosure is a pressure sensitive adhesive. The multi-layer article may be easier to apply if the adhesive layer consists of, consists primarily of, or at least comprises a pressure sensitive adhesive that is tacky at room temperature (i.e., around 75° F. (22-24° C.)). Exemplary pressure sensitive adhesive include an acrylic adhesive, a tackified styrene-butadiene-rubber adhesive, and combinations thereof.

In one embodiment, the adhesive is a hot melt adhesive (i.e., the adhesive is not tacky at room temperature, but becomes tacky upon heating); such adhesives include acrylics, ethylene vinyl acetate, and polyurethanes.

Release Liner

If a release liner is used during manufacture, it is typically removed just prior to application (e.g., on a vehicle) to prevent inadvertent adhesion of the article to undesired objects or itself, and to keep the adhesive free of contaminates (such as particulates or other contaminants, which may cause visible defects in the resulting multi-layer article). Such release liners are known in the art. Examples of suitable release liners include: paper, polymer film (e.g., polyester, polyethylene, or polypropylene), or other polymeric film material. The release liner may be coated with a material to decrease the amount of adhesion between the release liner and the adhesive layer. Such coatings can include, for example, a silicone or fluorochemical material. Any commercially available release liner may be used in the present invention. In one embodiment, the backside of the casting liner, opposite the first layer, is coated with a releasing agent, such that the adhesive layer contacts the backside of the casting liner, when the multi-layer article is in a roll format.

The multi-layer article is typically transparent or translucent. The multi-layer article may be transparent, translucent, or even opaque for other surface protection or enhancement applications, as desired. For some applications, it may be desirable for the multi-layer article to be colored. The multi-layer article may be colored, for example, by including a pigment or other coloring agent in one or more of its layers.

If used as a paint protection film, it is typically desirable for the present multi-layer article to be sized and shaped to conform to the surface to be protected, before the film is applied. Pre-sized and shaped pieces of the multi-layer article may be commercially desirable for protecting the painted surface of various body parts of a vehicle such as, for example, an automobile, aircraft, watercraft, snowmobile, truck, or train car, especially those portions of the vehicle body (e.g., the leading edge of the front hood and other leading surfaces and/or rocker panels) that are exposed to such hazards as flying debris (e.g., tar, sand, rocks, and/or insects). In one embodiment, the paint protection film of the present disclosure is thermoformable.

In one embodiment of the present disclosure, a functionalized organosilane (e.g., a silicone-silane or fluoro-silane) material may be applied to the first major surface of the first layer to further improve stain resistance, chemical, and/or solvent resistance. Typically, such a material would be applied after the multi-layer article is applied to a desired surface. A functionalized organosilane may be applied to the multi-layer article of the present disclosure. Such functionalized organosilanes include: a functionalized-silane sold under the trade designation "DYNASYLAN" (e.g., DYNASYLAN-8261 and DYNASYLAN HYROLSIL-2776) by Evonik Degussa Corporation, Prisppany, N.J.; an organosilicon such as RAIN-X; and a fluoro-silane sold under the trade designation "3M EASY CLEAN COATING ECC-4000" by 3M Co., St. Paul, Minn. Not only does the first layer as prepared according to the present disclosure show resistance to these a functionalized organosilane materials, these functionalized organosilane materials may be applied to the multi-layer article of the present disclosure and provide improved performance of the multi-layer article.

Because the present disclosure has discovered that the use of nanoparticles in a polyurethane layer, when prepared according to the method of the present disclosure, work to resistant surface care products, one can also envision replacing the thermoplastic polyurethane of the second layer with a different material such as another thermoplastic polymer or a metal to be used in applications wherein the polyurethane layer may come in contact with automotive care products.

Exemplary embodiments of the present disclosure include:

Embodiment 1

A method of making a multi-layer article comprising:
(a) coating a mixture comprising a polyurethane coating solution and a plurality of nanoparticles onto a casting liner to form a first layer, such that the first major surface of the first layer contacts the casting liner; and
(b) disposing a second layer onto the first layer opposite the first major surface.

Embodiment 2

The method of embodiment 1, wherein the thermoplastic polyurethane is laminated or extruded onto the composition opposite the first major surface.

Embodiment 3

The method of any one of the previous embodiments, wherein each nanoparticle of the plurality of nanoparticles comprises: silica, zirconia, titania, alumina, and combinations thereof.

Embodiment 4

The method of any one of the previous embodiments, wherein the surface of each nanoparticle of the plurality of nanoparticles is unmodified.

Embodiment 5

The method of any one of the previous embodiments, wherein each nanoparticle of the plurality of nanoparticles has an average diameter of less than about 50 nm.

Embodiment 6

The method of any one of the previous embodiments, wherein each nanoparticle of the plurality of nanoparticles has an average diameter of less than about 10 nm.

Embodiment 7

The method of any one of the previous embodiments, wherein the mixture comprises at least about 3000 ppm of the plurality of nanoparticles.

Embodiment 8

The method of any one of the previous embodiments, wherein the polyurethane coating solution is water-based.

Embodiment 9

The method of any one of the previous embodiments, further comprising contacting the second layer with an adhesive, such that the second layer is disposed between the first layer and the adhesive.

Embodiment 10

The method of embodiment 9, wherein the adhesive is a pressure sensitive adhesive.

Embodiment 11

The method of any one of embodiments 9-10, wherein the adhesive contacts a release liner and the adhesive is disposed between the release liner and the second layer.

Embodiment 12

The method of any one of the previous embodiments, further comprising removing the casting liner.

Embodiment 13

The method of embodiment 12, further comprising applying a composition comprising a functionalized organosilane onto the first major surface of the first layer.

Embodiment 14

The method of any one of the previous embodiments, wherein the second layer comprises a thermoplastic polyurethane.

Embodiment 15

A paint protection film comprising sequentially:
a first layer comprising a water-based polyurethane, and a plurality of unmodified, inorganic nanoparticles, wherein the unmodified, inorganic nanoparticles have an average diameter of about 50 nm or less;
a second layer comprising a thermoplastic polyurethane; and
an adhesive.

Embodiment 16

The paint protection film of embodiment 15, wherein the first layer further comprises a plurality of larger particles and wherein the plurality of larger particles are disposed through the thickness of the first layer in an increasing size gradient towards the second layer

Embodiment 17

A paint protection film comprising sequentially:
a first layer comprising a polyurethane, a plurality of nanoparticles, and a plurality of larger particles;
a second layer comprising a thermoplastic polyurethane; and
an adhesive;
wherein the plurality of larger particles are disposed through the thickness of the first layer in an increasing size gradient towards the second layer.

Embodiment 18

The paint protection film of embodiment 17, wherein each nanoparticle of the plurality of nanoparticles is inorganic.

Embodiment 19

The paint protection film of any one of embodiments 17-18, wherein the surface of each nanoparticle of the plurality of nanoparticles is unmodified.

Embodiment 20

The paint protection film of any one of embodiments 17-19, wherein each nanoparticle of the plurality of nanoparticles has an average diameter of less than about 50 nm.

Embodiment 21

The paint protection film of any one of embodiments 16-19, wherein the polyurethane of the first layer is a water-based polyurethane.

Embodiment 22

The paint protection film of any one of embodiments 15-16 and 20-21, wherein the individual nanoparticle has an average diameter of less than about 10 nm.

Embodiment 23

The paint protection film of any one of embodiments 16-21, wherein the increasing size gradient is discontinuous.

Embodiment 24

The paint protection film of any one of the embodiments 16-23, wherein each larger particle of the plurality of larger particles is a cluster of discrete nanoparticles.

Embodiment 25

The paint protection film of any one of embodiments 16-24, wherein the larger particles closest to the second layer have an equivalent circular diameter of at least about 100 nm.

Embodiment 26

The paint protection film of any one of embodiments 16-25, wherein the adhesive is a pressure sensitive adhesive.

Embodiment 27

The paint protection film of embodiment 26, wherein the a pressure sensitive adhesive is an acrylic adhesive.

Embodiment 28

The paint protection film of any one of embodiments 15-27, wherein the first layer comprises at least about 3000 ppm of the plurality of nanoparticles.

Embodiment 29

The paint protection film of any one of embodiments 15-28, wherein the first layer, second layer, and adhesive are transparent, translucent, or opaque.

Embodiment 30

The paint protection film of any one of embodiments 15-29, further comprises a layer of a functionalized organosilane, which is in contact with the major surface of the first layer opposite the second layer.

Embodiment 31

The paint protection film of any one of embodiments 15-30, further comprising a casting liner, wherein the first layer is disposed between the casting liner and the second layer.

Embodiment 32

The paint protection film of any one of embodiments 15-31, further comprising a release liner, wherein the adhesive is disposed between the release liner and the second layer.

Embodiment 33

The paint protection film of any one of embodiments 15-29 and 32, wherein the paint protection film is resistant to a composition comprising a strong acid and/or a functionalized organosilane.

Embodiment 34

The paint protection film of any one of embodiments 15-30 and 32, wherein the paint protection film is thermoformable.

Embodiment 35

The paint protection film of any one of embodiments 15-34, wherein the first layer, the second layer, or both the first and second layers comprise a coloring agent.

Embodiment 36

An article comprising the paint protective film according to any one of embodiments 15-31 and 33-35.

Embodiment 37

A paint protection film comprising sequentially:
a first layer having an exposed major surface and an opposite major surface, the first layer comprising a water-based polyurethane and a plurality of unmodified inorganic nanoparticles, wherein the unmodified inorganic nanoparticles have an average diameter of 50 nm or less, and the concentration of the unmodified inorganic nanoparticles is greatest at the exposed major surface than at the opposite major surface of the first layer;
a second layer disposed opposite the exposed major surface of the first layer, the second layer comprising a thermoplastic polyurethane; and
an adhesive

Embodiment 38

A method of making a multi-layer article comprising: providing a mixture comprising a polyurethane coating solution and a plurality of nanoparticles and coating the mixture onto a casting liner to form a first layer, such that the first major surface of the first layer contacts the casting liner.

EXAMPLES

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

All materials are commercially available, for example from Sigma-Aldrich Chemical Company; Milwaukee, Wis., or known to those skilled in the art unless otherwise stated or apparent.

These abbreviations are used in the following examples: g=gram, kg=kilograms, min=minutes, mol=mole; cm=centimeter, cps=centipoise, mm=millimeter, ml=milliliter, L=liter, psi=pressure per square inch, MPa=megaPascals, and wt=weight.

Test Methods
Staining Test Method

The adhesive-side of the sample was adhered to a standard RK8014 clear coated white painted panel available from ACT Test Panels Technologies, Hillsdale, Mich. If present, the casting liner was removed from the multi-layer article and two drops of a staining fluid was placed on the first major surface of the first layer and allowed to age for 24 hours. After 24 hours, the staining fluid was cleaned with varnish makers' and painters' naphtha (VM&P naphtha, from Ashland Chemical Co., Covingto, Ky.) and the sample was examined visually with the unaided eye for discoloration for each of the staining fluids. "Pass" means no visual to trace discoloration is visually observed, "Marginal" means slight discoloration is visually observed, and "Fail" indicates that more than just slight discoloration is visually observed. If noted, the sample was measured using a colorimeter to determine the discoloration or a gloss meter to determine the gloss change. Staining fluids tested were: road tar, fuel oil, 10 weight % road tar in diesel, and 10 weight % bitumen in diesel. Unless otherwise noted, the samples were tested with each of the staining fluids and the result reported is a summary of staining fluids tested.

Environmental Aging Test Method

The adhesive-side of the sample was adhered to a standard RK8014 clear coated white painted panel and, if present, the casting liner was removed from the sample and aged 24 hours at room temperature. The panel containing the sample was then aged using each one of the conditions listed below.

(A) Heat Aging: The panel containing the sample was placed on a rack at about a 30 degree angle and heated in an oven for 7 days at 80° C.;

(B) Water Immersion: The panel containing the sample was immersed for 7 days in water held at 40° C.;

(C) Condensing Humidity Fog: The panel containing the sample was placed on a rack at about a 30 degree angle and kept for 7 days in a humidity condensing chamber that was held at 38° C. with 100% humidity; and (D) Salt Spray: The panel containing the sample was placed on a rack at about a 30 degree angle and kept for 7 days in a salt fog chamber using a 5% sodium chloride solution that was held at 35° C.

After aging, the panels containing the sample were dried, if needed, and conditioned at room temperature (about 22° C.) for 24 hours. After conditioning, the sample on the panel was visually inspected by an unaided eye and tested using the "Tape Snap Adhesion Test Method" described below. For visual inspection of the sample after the environmental aging, the sample was rated as "Pass" when the sample did not show any visual color change, gloss change, cloudiness, or blistering. The sample was rated "Fail" when the sample showed a visual change in color or gloss, was cloudy, and/or blistered.

Tape Snap Adhesion Test Method—If present, the casting liner was removed and the first major surface of the first layer of the sample was cross-hatched cut using a razor blade to form a grid of 20 squares each measuring about 1 mm by 1 mm. A strip of 610 tape (available from 3M Company, St. Paul, Minn.) was adhered to the cross-hatched area using firm finger pressure and then the tape was removed manually with a quick pull by hand. The sample was rated as "Pass" indicating no delamination of any square after the tape was removed or "Fail" indicating that at least one square was removed with the tape.

RAIN-X Cloudiness Test Method

If present, the casting liner was removed and the adhesive-side of the sample was adhered to a stainless steel panel and immersed for 1 minute in RAIN-X (purchased at a retail store and manufactured by SOPUS Products, a division of Royal; Dutch Shell, London, UK). The panel containing the sample was removed and gently shaken to remove residual RAIN-X.

The panel containing the sample was then aged for 24 hours in a humidity condensing chamber that was held at 38° C. with 100% humidity. The panel containing the sample was removed from the chamber and dried with a cloth or paper towel to remove condensed water. The panel containing the sample was then immersed in RAIN-X for 1 minute, shaken and aged as just described. This process of immersion in RAIN-X, shaking, and aging was repeated again. After the last aging, the panel containing the sample was dried with a cloth or paper towel to remove condensed water and conditioned at room temperature (about 22° C.) for 24 hours. The sample was then visually inspected by an unaided eye for cloudiness. The sample is rated as "Pass" when the sample did not show any cloudiness, "Marginal" when the sample showed slight cloudiness, and "Fail" when the sample showed severe cloudiness.

Elongation Test Method

A sample was cut into a 1-inch (25.4 mm)-wide strip. The elongation test was conducted at 12 inches per minute (304 mm per minute) on a tensile tester (Model 1122 from MTS Systems Corp., Cary, N.C.). At least 7 samples were tested and the average % elongation was reported.

TEM and Particle Size Measurement Test Method

The particle size distribution of the first layer was examined using TEM and imaging analysis software. The sample was prepared using wet cryo-ultramicrotomy at −10° C. with 50/50 dimethylsulfoxide/water at a nominal thickness of 70 nm. The sample was measured using TEM (transmission electron microscopy, Hitachi H-9000 TEM, Hitachi, Ltd., Tokyo, Japan) at 300 kiloVolts at instrument magnifications of 1 kX, 2 kX, and 5 kX.

The spatial calibration information based on the TEM analysis was imported into an image analysis software (Aphelion available from ADCIS Corporate, Saint-Contest, Normandy, France). The image analysis software was then used to analyze the size and distribution of particles in the sample. Described below is the procedure used.

First, noise was removed from the input TEM image using a low pass filter (step 1). Then an image was created that was subsequently used to remove variation in the background illumination of the sample (step 2). The image then was normalized by dividing the image in step 2 into the image in step 1 and then a fixed threshold value of 0.997 was used to identify the particles. A grey scale threshold was used to aide in identifying the particles. Then, seven different sections of the cross-sectioned sample were analyzed at both the first major surface and the second major surface of the first layer. Each section typically measured approximately 4 micrometers wide and 100 nm deep (i.e., up to a distance of 100 nm from the major surface, perpendicular to the major surface of the first layer). Using the imaging software, the area of each identified particle was measured and the equivalent circular diameter was calculated. If a portion of the particle was outside of the measuring section, the portion of the particle outside of the section was not included in the particle area. After determining the equivalent circular diameter, the particle diameter was plotted to show the area weighted cumulative particle size distribution for the first and second major surfaces.

Examples

Comparative Example A (CE-A)

An aqueous polyurethane coating solution was prepared by mixing 83.87 grams of polyurethane dispersion (available under the trade designation "ALBERDINGK U933" from Alberdingk Boley, Inc, Charlotte, N.C.), 0.03 grams of pH adjuster (amonomethyl propanol available as AMP-95 from Dow Chemical Co., Buffalo Grove, Ill.), 0.19 grams of sulfosulccinate type surfactant (available under the trade designation "TRITON GRIM" from Dow Chemical Company, Midland, Mich.), 8.47 grams of butyl carbitol (available from Eastman Chemical Co., Kingsport, Tenn.), 1.08 grams of 2-ethylhexyl α-cyano-α,β"-diphenylacrylate UV light absorber, and 0.45 grams of a light stabilizer (hindered amine light stabilizer based on aminoether functionality available under the trade designation "TINUVIN-123" from BASF, Florham Park, N.J.). The aqueous polyurethane coating solution is diluted by de-ionized water to maintain viscosity between 60-200 cps. Just prior to coating, 1.3% crosslinker (a polyaziridine crosslinker available under the trade designation "NEOCRYL CX-100" from Neoresins, a business unit of DSM, Wilmington, Mass.) was added to the aqueous polyurethane coating solution under agitation. The aqueous polyurethane coating solution was coated to a wet thickness of about 50 microns onto a polyester casting liner. The coated aqueous polyurethane coating solution was dried and cured sequentially in separate ovens for about 0.5 minutes each. The oven temperatures were set at 75° C., 100° C., and 145° C. for the first, second, and third oven temperatures. The resulting cured clear film was about 11-12 microns thick. A thermoplastic polyurethane (caprolactone based polyurethane available under the trade designation "TECOFLEX CL93A-V" from Noveon, Wickliffe, Ohio) was extruded to a thickness of 150 microns and the extrudate was laminated to the cured, clear polyurethane film between the nip of a backup roll against a chill roll. After the laminate was cooled, the other side of the thermoplastic polyurethane layer, opposite the cured polyurethane clear layer, was air corona treated at 1 kilowatts and thermally laminated at 100° C. to an acrylic based pressure sensitive adhesive, which was disposed on a paper release liner to form a multi-layer construction. The polyester casting liner was then removed.

Example 1

The same procedure as described in Comparative Example A was used, except 10 grams of Nalco-1130 (8 nanometer size on colloidal silicas in 30% solids available from Nalco Chemical Company, Oakbrook, Ill.) was added and mixed into 100 grams of the aqueous polyurethane coating solution used in Comparative Example A.

Example 2

The same procedure as described in Comparative Example A was used, except 20 grams of Nalco-1130 (8 nanometer size colloidal silica, 30% solids available from Nalco Chemical Company, Oakbrook, Ill.) was added and mixed into 100 grams of the aqueous polyurethane coating solution used in Comparative Example A.

Example 3

The same procedure as described in Comparative Example A was used, except 30 grams of Nalco-1130 (8 nanometer size colloidal silica, 30% solids available from Nalco Chemical Company, Oakbrook, Ill.) was added and mixed into 100 grams of the aqueous polyurethane coating solution used in Comparative Example A.

Figure 3:
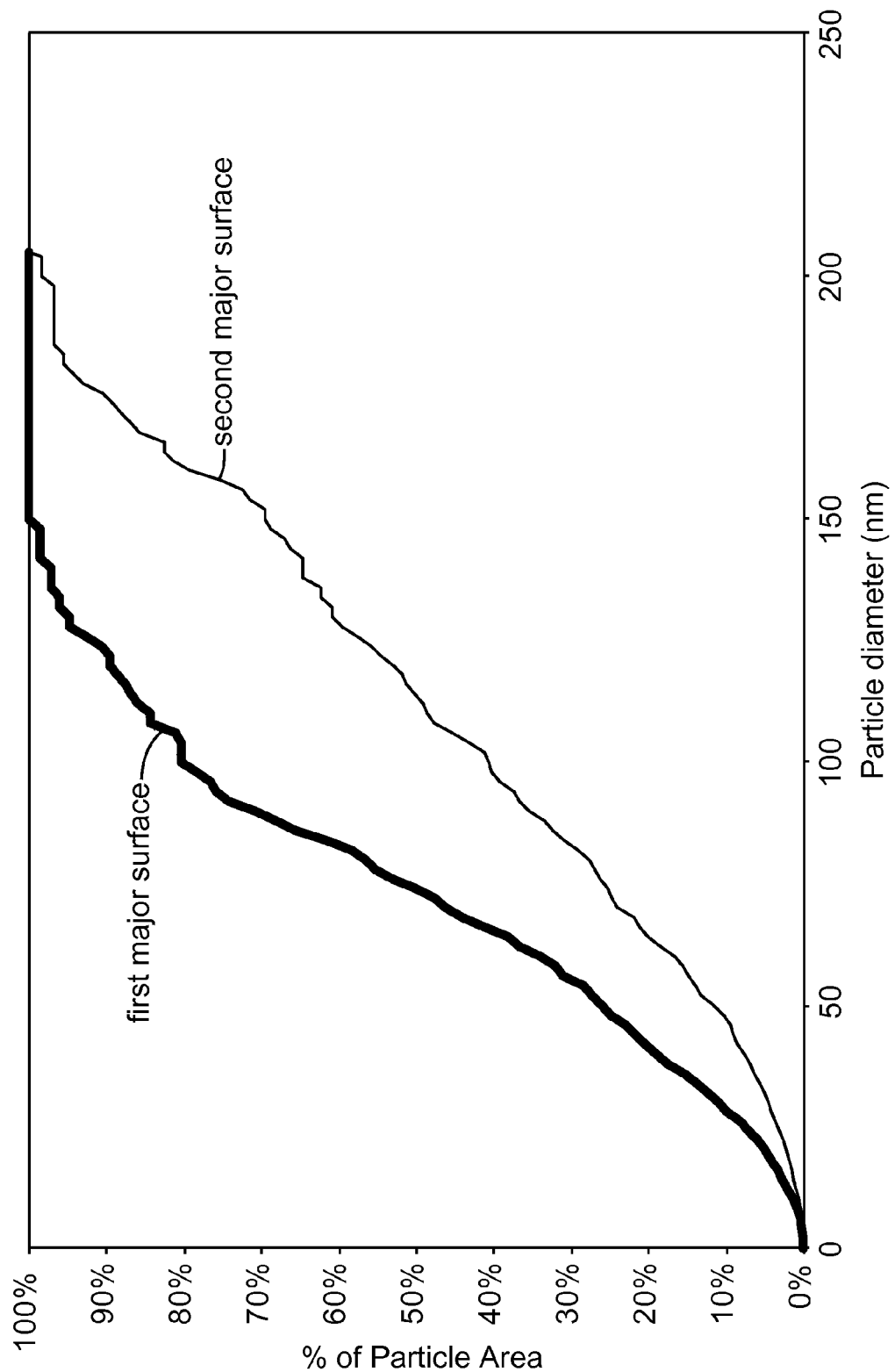
FIG. 3 is a plot showing the area weighted cumulative particle size distribution for Example 3.

Example 3 was analyzed using the TEM and Particle Size Measurement Test Method described above. A cross-section, perpendicular to the first major surface, of the first layer of Example 3 was analyzed. The results are shown in FIG. 3. As shown in FIG. 3, near the first major surface of the first layer, 50% of the total area of the particles have a diameter of less than approximately 71 nm, whereas near the second major surface of the first layer, 50% of the total area of the particles have a diameter of less than approximately 120 nm.

Example 4

The same procedure as described in Comparative Example A was used, except 10 grams of Nalco-1115 (4 nanometer size colloidal silica, 15% solids available from Nalco Chemical Company, Oakbrook, Ill.) was added and mixed into 100 grams of the aqueous polyurethane coating solution used in Comparative Example A.

Example 5

The same procedure as described in Comparative Example A was used, except 20 grams of Nalco-1115 (4 nanometer size colloidal silica, 15% solids available from Nalco Chemical Company, Oakbrook, Ill.) was added and mixed into 100 grams of the aqueous polyurethane coating solution used in Comparative Example A.

Example 6

The same procedure as described in Comparative Example A was used, except 30 grams of Nalco-1115 (4 nanometer size colloidal silica, 15% solids available from Nalco Chemical Company, Oakbrook, Ill.) was added and mixed into 100 grams of the aqueous polyurethane coating solution used in Comparative Example A.

Comparative Example A and Examples 1-6 were then tested for performance, following the Staining Test Method, Environmental Aging (EA) Test Method, Tape Snap Adhesion Test Method, RAIN-X Cloudiness Test Method, and % Elongation Test Method as described above. The results are shown in Table 1 below.

TABLE 1

| Test Method | | CE-A | Example 1 | 2 | 3 | 4 | 5 | 6 |
|---|---|---|---|---|---|---|---|---|
| Staining | | Marginal | Pass | Pass | Pass | Pass | Pass | Pass |
| EA-Condition A | Tape Snap | Pass | Pass | Pass | Pass | Pass | Pass | Pass |
| | Visual | Pass | Pass | Pass | Pass | Pass | Pass | Pass |
| EA-Condition B | Tape Snap | Pass | Pass | Pass | Pass | Pass | Pass | Pass |
| | Visual | Pass | Pass | Pass | Pass | Pass | Pass | Pass |
| EA-Condition C | Tape Snap | Pass | Pass | Pass | Pass | Pass | Pass | Pass |
| | Visual | Pass | Pass | Pass | Pass | Pass | Pass | Pass |
| EA-Condition D | Tape Snap | Pass | Pass | Pass | Pass | Pass | Pass | Pass |
| | Visual | Pass | Pass | Pass | Pass | Pass | Pass | Pass |
| RAIN-X | | Failed | Marginal | Pass | Pass | Marginal | Marginal | Pass |
| % Elongation | | 281.5 | 333.1 | 526.6 | 567.9 | 341.7 | 302.9 | 353.7 |

Example 7

The same procedure as described in Comparative Example A was used, except 12 grams of Nalco-1050 (20 nanometer size colloidal silica, 50% solids available from Nalco Chemical Company, Oakbrook, Ill.) was added and mixed into 100 grams of the aqueous polyurethane coating solution used in Comparative Example A.

Example 8

The same procedure as described in Comparative Example A was used, except 18 grams of Nalco-1050 (20 nanometer size colloidal silica, 50% solids available from Nalco Chemical Company, Oakbrook, Ill.) was added and mixed into 100 grams of the aqueous polyurethane coating solution used in Comparative Example A.

Comparative Example B (CE-B)

The same procedure as described in Comparative Example A was used, except 15 grams of Nalco-2329 (75 nanometer size colloidal silica, 40% solids available from Nalco Chemical Company, Oakbrook, Ill.) was added and mixed into 100 grams of the aqueous polyurethane coating solution used in Comparative Example A.

Comparative Example C (CE-C)

The thermoplastic polyurethane as described in Comparative Example A was extruded to a thickness of 150 microns and the extrudate was laminated to a polyester casting liner between the nip of a backup roll against a chill roll. After the laminate was cooled, the side of the thermoplastic polyurethane, opposite the polyester casting liner was air corona treated at 1 kilowatt and then thermally laminated to an acrylic based pressure sensitive adhesive on a paper release liner at 100° C. The polyester casting liner was removed to expose a major surface of the thermoplastic polyurethane. The polyurethane coating solution of Example 1, comprising the silica nanoparticles, was coated directly onto the exposed major surface of thermoplastic polyurethane layer. The multi-layer construction was then dried and cured sequentially in separate ovens for about 0.5 minutes each. The oven temperatures were set at 75° C., 100° C., and 145° C. for the first, second, and third oven temperatures.

Comparative Example D (CE-D)

The same procedure as described in Comparative Example C, above, was used except that the polyurethane coating solution of Example 2, instead of Example 1 was used.

Comparative Example E (CE-E)

The same procedure as described in Comparative Example C, above, was used except that the polyurethane coating solution of Example 3, instead of Example 1 was used.

Comparative Example F (CE-F)

The same procedure as described in Comparative Example C, above, was used except that the polyurethane coating solution of Example 7, instead of Example 1 was used.

Comparative Example G (CE-FG)

The same procedure as described in Comparative Example C, above, was used except that the polyurethane coating solution of Example 8, instead of Example 1 was used.

Comparative Example H (CE-H)

The same procedure as described in Comparative Example C, above, was used except that the polyurethane coating solution of Comparative Example B, instead of Example 1 was used.

Examples 7-8 and Comparative Examples B and F-H were then tested following the RAIN-X Cloudiness Test Method. Comparative Examples C-E were tested for performance following the Staining Test Method, RAIN-X Cloudiness Test Method, and % Elongation Test Method as described above. The results are shown in Table 2 below.

TABLE 2

| Test Method | Example | | | | | | | | |
|---|---|---|---|---|---|---|---|---|---|
| | 7 | 8 | CE-B | CE-C | CE-D | CE-E | CE-F | CE-G | CE-H |
| Staining | NT | NT | NT | Pass | Pass | NT | NT | NT | NT |
| RAIN-X | Marginal | Marginal | Fail | Fail | Fail | Fail | Fail | Fail | Fail |
| % Elongation | NT | NT | NT | 232.1 | 277.7 | 299.3 | NT | NT | NT |

NT means not tested

Example 9

A 1% solution of DYNASYLAN-8261 (a fluoro-silane) was prepared as follows. The solution was prepared by mixing 1 gram of DYNASYLAN-8621 with 85 grams of isopropyl alcohol, 13 grams of de-ionized water and 1 grams of 1.0 N of hydrochloric acid. The exposed first major surface of the aqueous-based polyurethane layer of the multi-layer articles of Examples 1-6 were coated with the 1% solution of a DYNASYLAN-8261. Then, a cotton cloth was used to rub the exposed major surface of the water-based polyurethane layer for 2 minutes. Each of the samples was allowed to cure at ambient temperature for 24 hours. The DYNASYLAN-8261 coated aqueous-based polyurethane layer was then cleaned with soap water followed by a mixture of isopropyl alcohol and water at 25/75 ratio.

The samples were then tested with Staining Test Method using road tar and fuel oil. The color change between the stained sample and a control was measured using a colorimeter. The control was the same sample (Examples 1-6) without the aging or application of the staining fluid. The results showed that the staining resistance of the multi-layer articles described in Examples 1-6 improved after treatment with a 1% DYNASYLAN-8621 solution.

Example 10

A 1% solution of DYNASYLAN HYROLSIL-2776 (a silicone-silane) was prepared as follows. The solution was prepared by mixing 1 gram of DYNASYLAN HYROLSIL-2776 with 85 grams of isopropyl alcohol, 13 grams of de-ionized water and 1 grams of 1.0 N of hydrochloric acid. The exposed major surface of the water-based polyurethane layer of the multi-layer articles of Examples 1-6 were coated with the 1% solution of a DYNASYLAN HYROLSIL-2776. Then, a cotton cloth was used to rub the exposed major surface of the water-based polyurethane layer for 2 minutes. Each of the samples was allowed to cure at ambient temperature for 24 hours. The DYNASYLAN HYROLSIL-2776-coated water-based polyurethane layer was then cleaned with soap water followed by a mixture of isopropyl alcohol and water at 25/75 ratio.

The samples were then tested with Staining Test Method using road tar and fuel oil. The color change was measured with a colorimeter against the control (Examples 1-6 without the aging or application of the staining fluid). The results showed that the staining resistance of the multi-layer articles described in Examples 1-6 improved after treatment with a 1% DYNASYLAN HYROLSIL-2776 solution.

Example 11

A 1% solution of 3M EASY CLEAN COATING ECC-4000 (a fluoro-silane) was prepared as follows. The solution was prepared by mixing 1 gram of 3M EASY CLEAN COATING ECC-4000 with 85 grams of isopropyl alcohol, 13 grams of de-ionized water and 1 grams of 1.0 N of hydrochloric acid. The exposed major surface of the water-based polyurethane layer of the multi-layer articles of Examples 1-6 were coated with the 1% solution of a 3M EASY CLEAN COATING ECC-4000. Then, a cotton cloth was used to rub the exposed major surface of the water-based polyurethane layer for 2 minutes. Each of the samples was allowed to cure at ambient temperature for 24 hours. The 3M EASY CLEAN COATING ECC-4000-coated water-based polyurethane layer was then cleaned with soap water followed by a mixture of isopropyl alcohol and water at 25/75 ratio.

The samples were then tested with Staining Test Method using road tar and fuel oil. The color change was measured with a colorimeter against the control (Examples 1-6 without the aging or application of the staining fluid). The results showed that the staining resistance of the multi-layer articles described in Examples 1-6 improved after treatment with a 1% 3M EASY CLEAN COATING ECC-4000 solution.

Foreseeable modifications and alterations of this invention will be apparent to those skilled in the art without departing from the scope and spirit of this invention. This invention should not be restricted to the embodiments that are set forth in this application for illustrative purposes. To the extent that there is a conflict or discrepancy between this specification and the disclosure in any document incorporated by reference herein, this specification will control.

What is claimed is:
1. A paint protection film comprising sequentially:
a first layer comprising a water-based polyurethane, and a plurality of unmodified inorganic nanoparticles, wherein the unmodified inorganic nanoparticles have an average diameter of about 50 nm or less;

a second layer comprising a thermoplastic polyurethane; and an adhesive, wherein the first layer comprises a plurality of larger particles and wherein the plurality of larger particles are disposed through the thickness of the first layer in an increasing size gradient towards the second layer and wherein the increasing size gradient is discontinuous.

2. The paint protection film of claim 1, wherein each larger particle of the plurality of particles is a cluster of discrete nanoparticles.

3. The paint protection film of claim 1, further comprises a layer of functionalized organosilane, which is in contact with the major surface of the first layer opposite the second layer.

4. The paint protection film of claim 1, wherein the paint protection film is resistant to a composition comprising a strong acid and/or functionalized organosilane.

5. The paint protection film of claim 1, wherein the first layer, the second layer or both the first and second layers comprise a coloring agent.

6. An article comprising the paint protective film according to claim 1.

7. A paint protection film comprising sequentially:

a first layer comprising a polyurethane, a plurality of nanoparticles, and a plurality of larger particles;

a second layer comprising a thermoplastic polyurethane; and an adhesive;

wherein the plurality of larger particles are disposed through the thickness of the first layer in an increasing size gradient towards the second layer and wherein the increasing size gradient is discontinuous.

8. The paint protection film of claim 7, wherein the polyurethane of the first layer is a water-based polyurethane.

9. The paint protection film of claim 7, wherein each larger particle of the plurality of particles is a cluster of discrete nanoparticles.

10. The paint protection film of claim 7, further comprises a layer of functionalized organosilane, which is in contact with the major surface of the first layer opposite the second layer.

11. The paint protection film of claim 7, wherein the paint protection film is resistant to a composition comprising a strong acid and/or functionalized organosilane.

12. The paint protection film of claim 7, wherein the first layer, the second layer or both the first and second layers comprise a coloring agent.

\* \* \* \* \*